(12) United States Patent
Shaffer et al.

(10) Patent No.: US 6,826,599 B1
(45) Date of Patent: Nov. 30, 2004

(54) METHOD AND APPARATUS FOR OPTIMIZING MEMORY USE IN NETWORK CACHING

(75) Inventors: Shmuel Shaffer, Palo Alto, CA (US); James A. Aviani, Jr., Santa Barbara, CA (US); Martin Cieslak, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 780 days.

(21) Appl. No.: 09/594,658

(22) Filed: Jun. 15, 2000

(51) Int. Cl.[7] ............................................. G06F 15/167
(52) U.S. Cl. ....................................... 709/213; 711/133
(58) Field of Search ................................ 709/213, 214, 709/216; 711/133, 138, 139

(56) References Cited

U.S. PATENT DOCUMENTS

| | | | | |
|---|---|---|---|---|
| 5,694,591 A | * | 12/1997 | Du et al. ........................ | 707/2 |
| 5,943,687 A | * | 8/1999 | Liedberg ...................... | 711/156 |
| 5,999,968 A | * | 12/1999 | Tsuda .......................... | 709/213 |
| 6,021,470 A | * | 2/2000 | Frank et al. ................. | 711/138 |
| 6,185,625 B1 | * | 2/2001 | Tso et al. .................... | 709/247 |
| 6,385,699 B1 | * | 5/2002 | Bozman et al. ............. | 711/133 |
| 6,408,360 B1 | * | 6/2002 | Chamberlain et al. ...... | 711/124 |
| 6,425,057 B1 | * | 7/2002 | Cherkasova et al. ........ | 711/134 |
| 6,587,928 B1 | * | 7/2003 | Periyannan et al. ........ | 711/138 |
| 6,601,090 B1 | * | 7/2003 | Gurijala et al. ............. | 709/213 |

OTHER PUBLICATIONS

Pei Cao and Sandy Irani, *Cost–Aware WWW Proxy Caching Algorithms*, Dec. 1997, Proceedings of the 1997 USENIX Symposium of Internet Technology and Systems, pp. 193–206.

* cited by examiner

*Primary Examiner*—David Wiley
*Assistant Examiner*—Scott M. Collins
(74) *Attorney, Agent, or Firm*—Beyer, Weaver & Thomas, LLP.

(57) ABSTRACT

Techniques for handling objects in a network cache are described. A cost function value is calculated for each of a plurality of data objects. The cost function value relates to at least one metric relating to a total time required to download a corresponding one of the plurality of data objects. Each of the plurality of data objects are handled by the network cache according to its cost function value.

26 Claims, 3 Drawing Sheets ized with the advent of SOCKS which was essentially a daemon on a Unix machine. Software on a client platform on the network protected by the firewall was specially configured to communicate with the resident demon which then made the connection to a destination platform at the client's request. The demon then passed information back and forth between the client and destination platforms acting as an intermediary or "proxy."
METHOD AND APPARATUS FOR OPTIMIZING MEMORY USE IN NETWORK CACHING

BACKGROUND OF THE INVENTION

The present invention relates to transmission of data in a network environment. More specifically, the present invention relates to methods and apparatus for improving the efficiency with which data are transmitted over the Internet. Still more specifically, the present invention provides techniques by which the efficacy of an Internet cache may be improved.

Generally speaking, when a client platform communicates with some remote server, whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for http and the WWW. The source IP address would, of course, be the IP address for the client platform and the source port would be one of the TCP ports selected by the client. These five pieces of information define the TCP connection.

Given the increase of traffic on the World Wide Web and the growing bandwidth demands of ever more sophisticated multimedia content, there has been constant pressure to find more efficient ways to service data requests than opening direct TCP connections between a requesting client and the primary repository for the desired data. Interestingly, one technique for increasing the efficiency with which data requests are serviced came about as the result of the development of network firewalls in response to security concerns. In the early development of such security measures, proxy servers were employed as firewalls to protect networks and their client machines from corruption by undesirable content and unauthorized access from the outside world. Proxy servers were originally based on Unix machines because that was the prevalent technology at the time. This model was generalized with the advent of SOCKS which was essentially a daemon on a Unix machine. Software on a client platform on the network protected by the firewall was specially configured to communicate with the resident demon which then made the connection to a destination platform at the client's request. The demon then passed information back and forth between the client and destination platforms acting as an intermediary or "proxy."

Not only did this model provide the desired protection for the client's network, it gave the entire network the IP address of the proxy server, therefore simplifying the problem of addressing of data packets to an increasing number of users. Moreover, because of the storage capability of the proxy server, information retrieved from remote servers could be stored rather than simply passed through to the requesting platform. This storage capability was quickly recognized as a means by which access to the World Wide Web could be accelerated. That is, by storing frequently requested data, subsequent requests for the same data could be serviced without having to retrieve the requested data from its original remote source. Currently, most Internet service providers (ISPs) accelerate access to their web sites using proxy servers.

Unfortunately, interaction with such proxy servers is not transparent, requiring each end user to select the appropriate proxy configuration in his or her browser to allow the browser to communicate with the proxy server. For the large ISPs with millions of customers there is significant overhead associated with handling tech support calls from customers who have no idea what a proxy configuration is. Additional overhead is associated with the fact that different proxy configurations must be provided for different customer operating systems. The considerable economic expense represented by this overhead offsets the benefits derived from providing accelerated access to the World Wide Web. Another problem arises as the number of WWW users increases. That is, as the number of customers for each ISP increases, the number of proxy servers required to service the growing customer base also increases. This, in turn, presents the problem of allocating packet traffic among multiple proxy servers.

Another technique for increasing the efficiency with which data requests are serviced is described in commonly assigned, copending U.S. patent application Ser. No. 08/946, 867 for METHOD AND APPARATUS FOR FACILITATING NETWORK DATA TRANSMISSIONS filed Oct. 8, 1997, the entirety of which is incorporated herein by reference for all purposes. The invention described in that copending application represents an improvement over the proxy server model which is transparent to end users, high performance, and fault tolerant. By altering the operating system code of an existing router, the router is enabled to redirect data traffic of a particular protocol intended for a specified port, e.g., TCP with port 80, to one or more caching engines connected to the router via an interface having sufficient bandwidth such as, for example, a 100baseT interface. If there are multiple caching engines connected to the cache-enabled router, the router selects from among the available caching engines for a particular request based on a simple algorithm according to which a particular group of addresses is associated with each caching engine.

The caching engine to which the request is re-routed "spoofs" the requested destination platform and accepts the request on its behalf via a standard TCP connection established by the cache-enable router. If the requested information is already stored in the caching engine, i.e., a cache "hit" occurs, it is transmitted to the requesting platform with a header indicating its source as the destination platform. If the requested information is not in the caching engine, i.e., a cache "miss" occurs, the caching engine opens a direct TCP connection with the destination platform, downloads the information, stores it for future use, and transmits it to the requesting platform. All of this is transparent to the user at the requesting platform which operates exactly as if it were communicating with the destination platform. Thus, the need for configuring the requesting platform to suit a particular proxy configuration is eliminated along with the associated overhead. Moreover, traffic may be easily allocated among as many caching engines as become necessary. Thus, content caching provides a way to compensate for the bandwidth limitations discussed above.

The success of content caching in compensating for bandwidth limitations corresponds directly to the efficiency with which the caching engines operate. The higher the cache hit rate, i.e., cache hits as a percentage of the total number of requests, the greater the bandwidth savings. For a typical caching engine, the cache hit rate is approximately 30 to 40%. This percentage includes cache misses for non-cacheable objects. This means that 60 to 70% of objects stored in caching engines are never used again. That is, 60 to 70% of the caching engine's storage is used to store objects which will never be requested again. In addition, because new objects are constantly replacing old objects, it is likely that some of the 30 to 40% of objects which are likely to be requested more than once are being overwritten by the objects which will never be requested again. It is therefore clear that the typical caching engine is working nowhere near the level of efficiency which is at least theoretically possible.

Techniques for improving caching efficiency are described in commonly assigned copending U.S. patent application Ser. No. 09/259,149 for METHODS AND APPARATUS FOR CACHING NETWORK TRAFFIC filed on Feb. 26, 1999, the entirety of which is incorporated herein by reference for all purposes. The invention described therein achieves improvements in caching efficiency by favoring the caching of objects which are statistically likely to be requested again. According to a one embodiment, when a caching engine experiences an initial cache miss for a requested object, the object is retrieved and sent to the requesting host but the object is not cached. Instead, the caching engine makes an entry corresponding to the requested object in a table in which it tracks objects for which at least one cache miss has occurred. If another request for the object is received, the object is retrieved, sent to the requesting host, and, because an entry corresponding to the requested object exists in the table, the object is cached. In other words, an object is only cached if it has been requested at least twice. The idea is that if an object has been requested two or more times it is statistically more likely to be requested again than an object for which only one request has been received. It follows then that, because the cache is populated only by objects which are likely to be requested, cache efficiency is correspondingly improved.

When a cache memory fills up, the cache must discard some stored objects to free up space for incoming objects. Existing approaches for evicting objects from a cache include, for example, simple first-in-first-out (FIFO), least-frequently-used (LFU), and least-recently-used (LRU) schemes. A more sophisticated algorithm for evicting objects from a network cache is described in commonly assigned, copending U.S. patent application Ser. No. 09/583,588 for METHODS AND APPARATUS FOR IMPROVING CONTENT QUALITY IN WEB CACHING SYSTEMS filed on May 31, 2000, the entirety of which is incorporated herein by reference for all purposes. The common thread among most such schemes is the attempt to maximize the number of access hits to objects already stored in the cache memory by tracking the number of access hits for each object in the cache.

Unfortunately, even if such object eviction schemes achieve the goal of maximizing the number of hits per object in a cache, this does not necessarily translate into an improved quality of service for particular end users. That is, as users navigate the Web, they download content from a wide variety of geographic locations via a wide variety of narrow and wide band connections. While it is clearly beneficial from the user's perspective to cache content from a geographically distant location which transmits data via a narrow band connection, there will likely be no perceptible improvement if content is cached from a nearby platform with which the user has a wide band connection. While the use of the cache in the former case is clearly indicated, its use in the latter would clearly be a waste of cache memory resources.

Therefore, despite the improvements represented by all of the techniques described above, and given the value of any improvement in the usage of network transmission resources, it is desirable to improve the efficacy with which network caching systems cache and discard data objects.

SUMMARY OF THE INVENTION

According to the present invention, techniques are provided which employ at least one metric relating to the time for accessing and/or downloading a data object either to determine when to discard the object from a network cache memory or to determine whether to cache the object in the first place. As mentioned above, other techniques track the number of times an object has been accessed in, for example, some given time period. According to various embodiments, the present invention uses at least one or various combinations of a plurality of metrics including, for example, the access or download time for the object, to develop a cost function for each object according to which the handling of the object may be determined. According to various embodiments, these metrics may also include the number of accesses for the object, the size of the object, or the bandwidth required to download the object.

According to a specific embodiment, the cost function is calculated for each object in a network cache memory, and the objects are sorted in order of their cost function value. As each new object arrives at the network cache it is stored according to its cost function value. When the cache memory becomes full, the objects with the least favorable cost function values are discarded to accommodate new objects. According to another specific embodiment, a cost function value is calculated for each potentially cacheable object to determine whether the object should be cached.

Thus, the present invention provides methods and apparatus for handling objects in a network cache. A cost function value is calculated for each of a plurality of data objects. The cost function value is determined with reference to at least one metric which relates to a total time required to download a corresponding one of the plurality of data objects and provides a relative measure of a cost of caching the corresponding object. Each of the plurality of data objects is handled according to its cost function value.

According to a specific embodiment, the plurality of metrics for each object includes at least one of an access time, a download time, an object size, and a number of object requests. According to another specific embodiment, handling each of the plurality of data objects according to its cost function value comprises determining whether each of the data objects is cacheable with reference to its cost function value. According to yet another specific embodiment, handling each of the plurality of data objects according to its cost function value comprises sorting a subset of the plurality of data objects stored in the network cache with reference to the corresponding cost value functions thereby generating a sorted list. According to a more specific embodiment, selected ones of the subset of data objects are evicted from the network cache to accommodate storage of new data objects based on positions of the selected data objects in the sorted list.

A further understanding of the nature and advantages of the present invention may be realized by reference to the remaining portions of the specification and the drawings.

DETAILED DESCRIPTION OF SPECIFIC EMBODIMENTS

Figure 1:
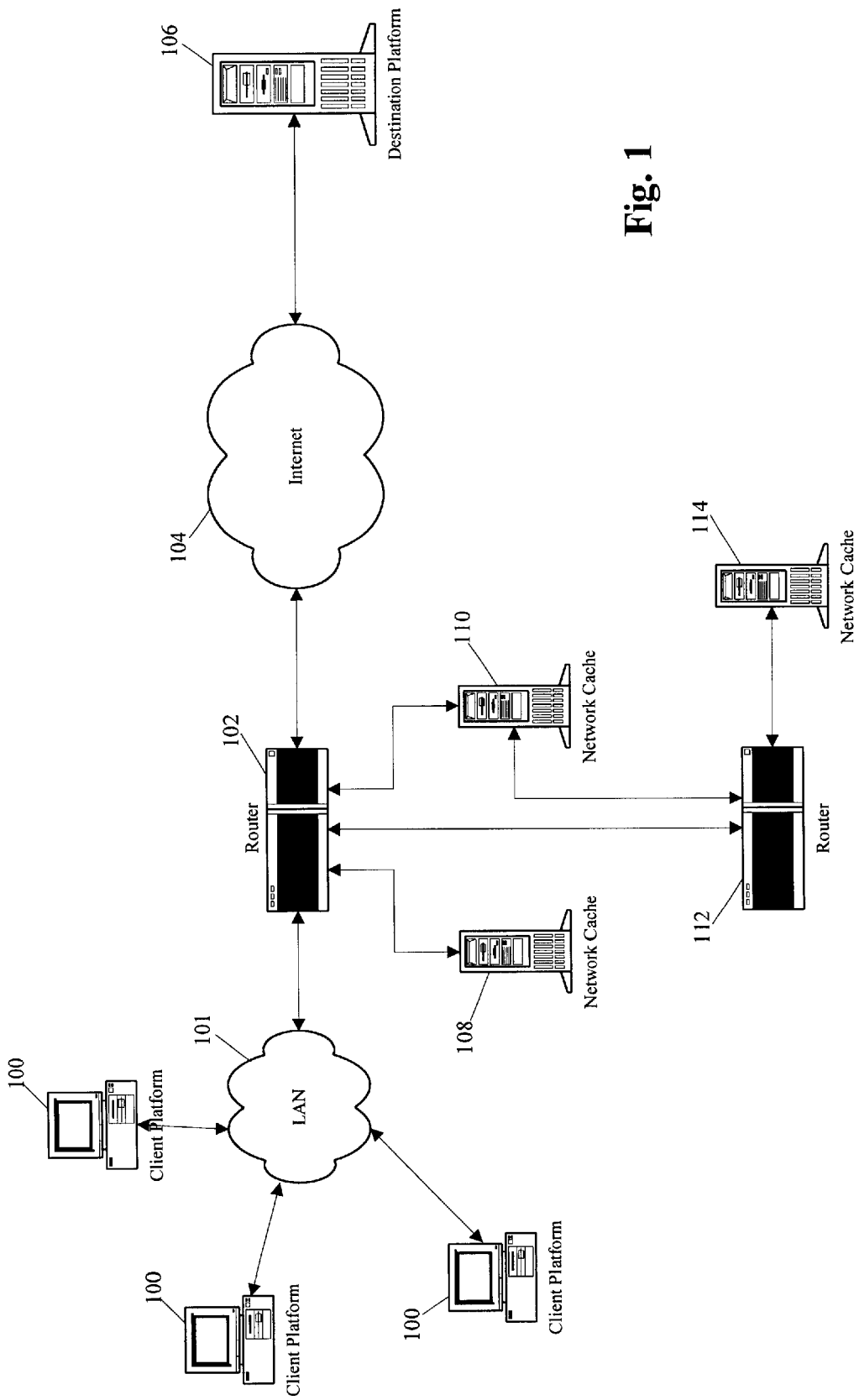
FIG. 1 is a block diagram of a network environment in which specific embodiments of the present invention may be implemented.

FIG. 1 shows a hardware environment in which the present invention may be implemented. A plurality of client platforms 100 are interconnected via LAN 101. LAN 101 is connected to router 102 which is connected via network 104 to destination platform 106. It will be assumed for the purposes of this discussion that client platforms 100 are single personal computers or work stations, that router 102 connects platform 100 to the Internet, i.e., network 104, and that destination platform 106 is a server on the World Wide Web. It should be noted, however, that a variety of configurations similar to this simple model may be employed without departing from the scope of the invention. For example, client platforms 100 could be connected via a wide area network. Router 102 could be an internal router in a LAN or a WAN (e.g., an intranet connection to an internal web page), the network's general gateway to the Internet, a direct connection to destination platform 106, or some intermediate platform between the network and destination platform 106. The connection between router 102 and client platforms 100 could include several intervening routers. Network 104 could represent a local or wide area network which includes client platforms 100 and router 102, or the Internet. Destination platform 106 could be part of the local or wide area network, or a remote server on the Internet. Referring back to FIG. 1, network caches 108 and 110 are connected to router 102. Additional router 112 is connected to router 102 and has an additional network cache 114 connected thereto.

It will be understood that the network caches described herein may employ any of a variety of existing file systems and remain within the scope of the invention. For example, the invention may be implemented using a Unix general purpose file system or the equivalent. A particular embodiment of the invention employs the file system described in commonly assigned, U.S. Pat. No. 5,950,205 for DATA TRANSMISSION OVER THE INTERNET USING A CACHE MEMORY FILE SYSTEM issued on Sep. 7, 1999, the entire specification of which is incorporated herein by reference for all purposes.

During normal operation, a client platform 100 transmits a request to retrieve data such as, for example, a multimedia object from destination platform 106. Cache-enabled router 102 receives the request in the form of at least one data packet. Router 102 reads the packet header to determine whether, for example, it is a TCP packet and indicates port 80 as its destination port. If the packet is of a different protocol or is not destined for the World Wide Web, the packet is simply passed through the router and routed according to standard Internet protocols.

If, on the other hand, the packet is TCP and port 80 is specified, router 102 determines to which of its associated network caches (108 and 110) it will redirect the packet based on the destination IP address specified in the packet. Before sending the packet to one of its associated network caches, router 102 encapsulates the packet for transmission to the selected network cache by adding another TCP/IP header which designates the router as the source of the packet and the network cache as the destination. That is, the router encapsulates the packet for transmission to a network cache which might be several "hops" away. So, for example, router 102 might encapsulate the packet for transmission to network cache 114 which is connected to router 102 via router 112. Thus, not only may multiple network caches be associated with a particular router, but multiple routers may be supported by an individual network cache or a group of network caches. This allows a tremendous amount of flexibility in where the network cache and router need to be in relation to each other. It will, of course, be understood that the present invention is not limited to port 80 or any particular packet encapsulation scheme (e.g., GRE, MAC, etc.)

A TCP connection is established between the client and the selected network cache and router 102 transmits the encapsulated packet to the network cache. The network cache determines if it has the requested object stored locally by comparing the destination URL to its directory. If the object is determined to be locally stored in the network cache, it is transmitted to client platform 100. If, on the other hand the object is not in the cache, the network cache makes its own request for the object (using its own address as the source IP address) to destination platform 106 via router 102. That is, a TCP connection is established between the network cache and destination platform 106. The router sees that the new request is from the network cache (by looking at the source address) and thereby knows not to redirect the packet to the network cache. This request and the subsequent retrieval of the object from destination platform 106 is done according to standard TCP/IP protocols. The retrieved object is then transmitted to client platform 100.

Figure 2:
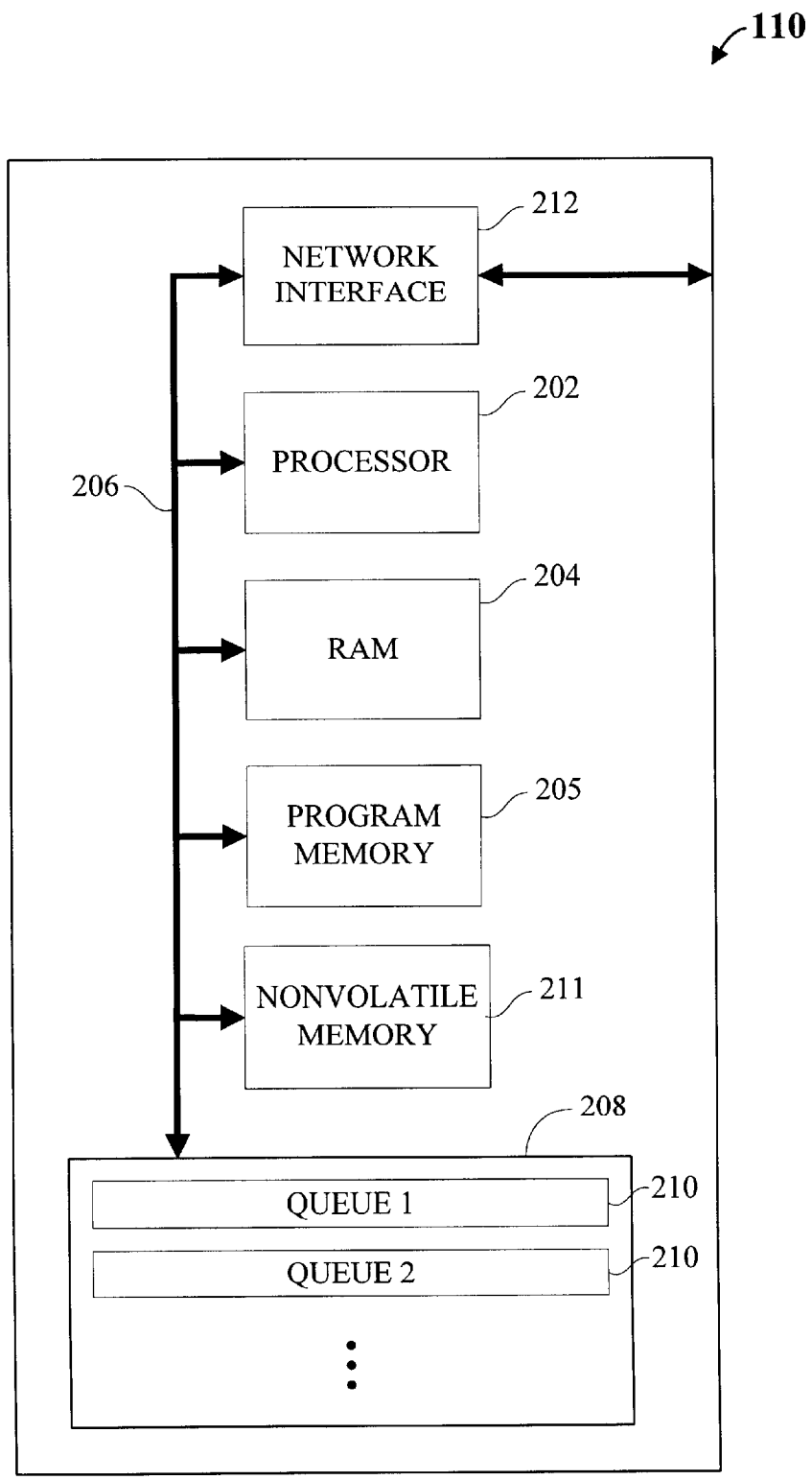
FIG. 2 is a block diagram of a network cache for use with specific embodiments of the present invention.

FIG. 2 is a block diagram of a network cache such as, for example, cache 110 of FIG. 1. A central processor 202 controls operation of cache 110 and its various subsystems using system memory 204 and bus 206. Data objects are stored in cache memory 208 which, in a specific embodiment, comprises multiple queues of volatile. RAM 210. According to various embodiments, memory 208 may comprise one or more nonvolatile disk drives. According to yet other embodiments, memory 208 may comprise any combination of volatile and nonvolatile memory.

According to a specific embodiment, a nonvolatile disk drive 211 is provided as additional storage for cached objects. According to a more specific embodiment, cache objects below a certain size, e.g., html objects, are stored in RAM queues 210 and those above a certain size, e.g., graphic objects, are stored in nonvolatile memory 211. In one such embodiment, the size threshold for determining in which memory to cache an object is 16 K. That is, objects which are 16 kilobytes or smaller would be stored in RAM queues 210, while object larger than 16 kilobytes would be stored in memory 211. In another such embodiment, the size threshold is 32 K. This segregation of objects by size allows extremely fast access to most cache objects via the RAM without the potential for very large objects to completely swamp a particular RAM queue and undermine the efficiency of cache operation.

A network interface 212 enables communication with external devices. Portions of memory 210 may also be employed for other purposes such as, for example, storing software code for directing the operation of various functionalities of cache 110. Alternatively, program instructions for execution by processor 202 directing operation of the functionalities of cache 110 may be stored in a separate program memory 205. It will be understood that the cache architecture shown in FIG. 2 is merely illustrative and should not be construed to limit the scope of the present invention. That is, any of a wide variety of cache architectures may be employed to implement the present invention.

Figure 3:
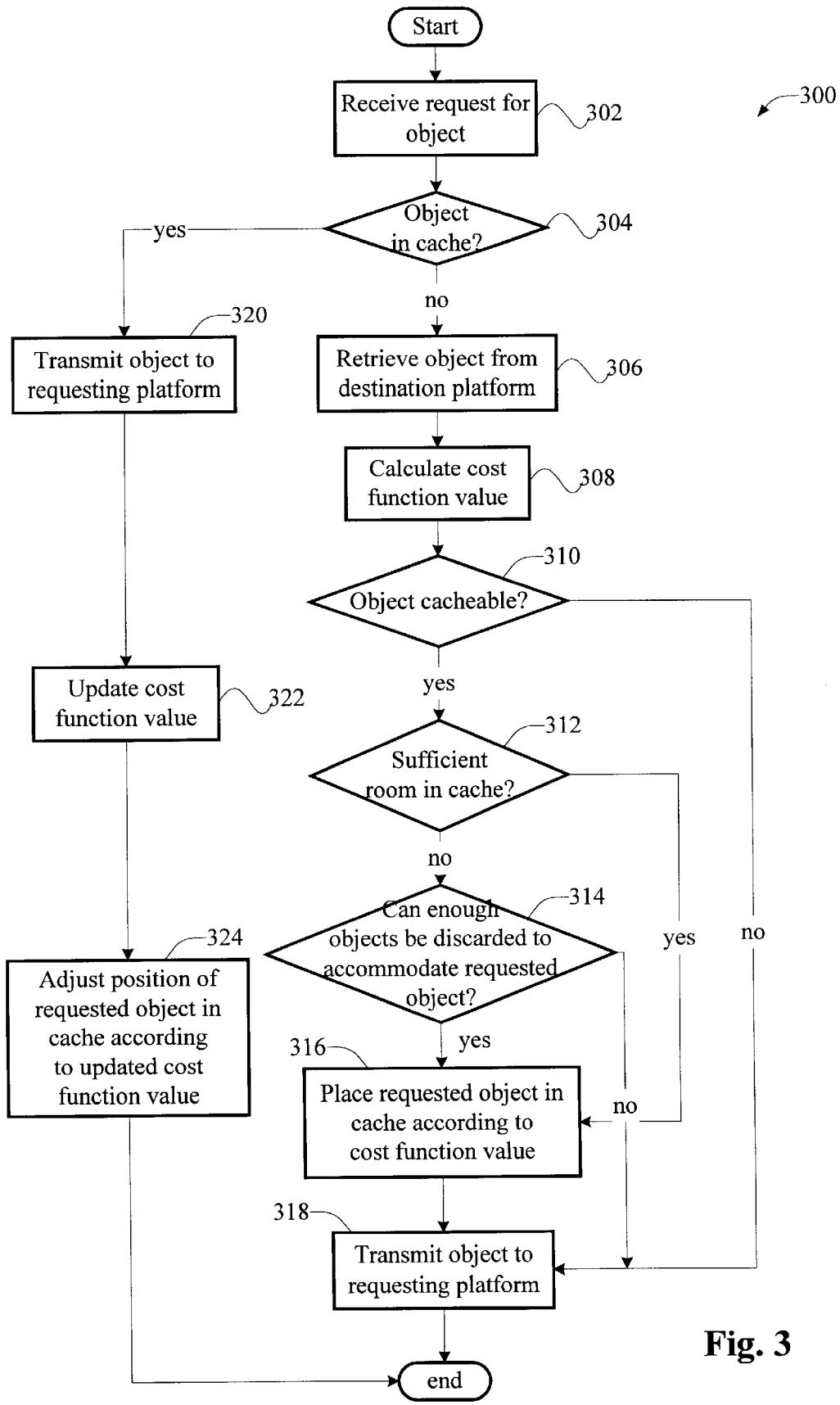
FIG. 3 is a flowchart illustrating the caching of objects according to a specific embodiment of the present invention.

A specific embodiment of the present invention will now be described with reference to flowchart 300 of FIG. 3.

When a request for an object is received by a cache configured according to the invention (302) and the object is determined not to be in the cache (304) the requested object is retrieved from the destination platform to which the original request was directed (306). A cost function value for the retrieved object is then calculated (308).

According to specific embodiments of the present invention, the cost function (CF) is based on at least one metric which affects the total time required to download the corresponding object. According to various embodiments, such metrics may include (but are not limited to) the number (n) of cache requests for the particular object, the access time (AT) for the object, the download time (DT) for the object, and the size (S) of the object. According to one embodiment, AT is determined by measuring the time between the first request from the cache to the destination platform and the first response received by the cache from the destination platform. According to one embodiment, DT is the time required for downloading the requested object from the destination platform to the cache.

According to a more specific embodiment, the cost function is simply the download time DT for the object. According to another embodiment, the cost function is the download time DT plus the access time AT. According to another more specific embodiment, the cost function is a function of all of these metrics, i.e., CF=f(n, AT, DT, S). According to a still more specific embodiment, the cost function is given by CF=n*AT*DT/S. Note that the DT/S term in this expression relates to the speed of the link. Note also that the lower the cost value, the less desirable it is to cache the corresponding object. That is, if the number of hits is low for a cached object, or the access or download times for a requested object are low, or the object is very large it is less likely that the object will be cached or stay in the cache very long. This makes sense in that, as discussed above, the desirability of caching an object tracks the number of times it is requested. In addition, if the AT or DT are very small, there is not much of an advantage for the end user in terms of performance and therefore such objects should not take up space in the cache. Finally, large objects are not favored in caching because they take up a lot of the memory for their share of cache hits.

Of course, it will be understood that the present invention is not limited to any particular formulation for the cost function. That is, cost functions using any of these metrics in various combinations which may include other metrics not described herein are also within the scope of the present invention. In addition, other metrics may be employed which relates to any of the metrics described above. For example, a bandwidth metric relating to the bandwidth of the connection between the cache and the destination platform may be employed. As will be understood, such a metric relates to the access time and download time for a given size object.

According to yet another embodiment, the network cache maintains a dynamic list of domain names for which the CF values are consistently low. According to this embodiment, objects from domains on the list are not cached to save I/O bandwidth. Thus, the determination of cacheability at 310 may also be done with reference to such a list of domains or object sources.

Referring again to FIG. 3, and according to a specific embodiment of the invention, the cache determines whether the requested object is cacheable with reference to the cost function value (310). According to a specific embodiment, this is done by comparing the cost function value to a configurable threshold value below or above which (depending on CF) the object is not considered worth caching. If cacheable, and there is not sufficient room in the cache (312), and there are enough objects in the cache which may be discarded or evicted from the cache memory to accommodate the requested object (314), such objects are evicted to make room for the requested object. According to a specific embodiment, this determination is done with reference again to the CF value. That is, according to this embodiment, all of the objects in the cache are sorted according to their CF values. The least valuable objects in the cache according to this sorting are discarded first. According to such embodiments, there must be a sufficient number of objects in the cache having CF values indicating a lower value than the requested object for the requested object to be cached.

If there was sufficient room in the cache (312) or there was a sufficient number of objects of lower value to be discarded to accommodate the new object (314) the requested object is placed in the cache memory and the sort according to its CF value (316). The object is then transmitted to the requesting platform (318). If at 310 it was determined that the object was not cacheable or if at 314 there was not a sufficient number of lower value objects in the cache to be evicted, it is also transmitted to the requesting platform (318) without being cached.

If at 304 it is determined that the requested object is already stored in the cache, the object is transmitted to the requesting platform (320) and the cost function value for the object is updated (322). That is, where the cost function depends on the number of requests received by the cache for the object, the cost function value needs to have this metric updated. The position of the requested object in the CF value sort is then adjusted based on the updated CF value (324). Thus, to the extent that an object continues to be requested, its chances for remaining in the cache are enhanced.

While the invention has been particularly shown and described with reference to specific embodiments thereof, it will be understood by those skilled in the art that changes in the form and details of the disclosed embodiments may be made without departing from the spirit or scope of the invention. For example, the embodiments described above with reference to FIG. 3 include the combination of using the CF to determine cacheability, to identify particular domains, and to discard cached objects. It will be understood, however, that the present invention may use any one of these alone or in combination with any of the others and still remain within the scope of the invention. Therefore, the scope of the invention should be determined with reference to the appended claims.

What is claimed is:

1. A computer implemented method for handling objects in a network cache comprising:

calculating a cost function value for each of a plurality of data objects, the cost function value being determined with reference to at least one metric relating to a total time required to download a corresponding one of the plurality of data objects and providing a relative measure of a cost of caching the corresponding object; and evaluating each of the plurality of data objects according to its cost function value, wherein evaluating each of the plurality of data objects according to its cost function value comprises determining whether each of the data objects will be added to the network cache based directly upon its cost function value and not based upon any attributes of currently cached objects.

2. The method of claim 1 wherein the at least one metric for each object includes at least one of an access time, a download time, an object size, and a number of object requests.

3. The method of claim 2 wherein the cost function value for each object is determined with reference to a download time.

4. The method of claim 3 where the cost function value for each object is also determined with reference to an access time.

5. The method of claim 2 wherein the cost function value for each object is determined with reference to each of th access time, the download time, the object size, and tho number of object requests.

6. The method of claim 5 wherein the cost function value for each object is proportional to each of the access time, the download time, the object size, and the number of object requests.

7. The method of claim 6 wherein the cost function value for each object comprises the product of the access time the download time and the number of object requests divided by object size.

8. The method of claim 1 wherein determining whether each of the data objects will be added to the network cache comprises comparing the corresponding cost function value to a caching threshold.

9. The method of claim 1 further comprising determining whether the corresponding cost con value exceeds cost function values associated with a sufficient number of the currently cached objects.

10. The method of claim 1 further comprising generating a list of domains from which a majority of retrieved objects have corresponding cost function values indicating a caching cost beyond a caching threshold, determining whether each of the data objects is cacheable comprising determining whether each of the data objects was retrieved from one of the domains in the list.

11. The method of claim 1 wherein evaluating each of the plurality of data objects according to its cost function value further comprises sorting a subset of the plurality of data object stored in the network cache with reference to the corresponding cost value functions thereby generating a sorted list.

12. The method of claim 11 wherein evaluating each of the plurality of data objects according to its cost function value further comprises evicting selected ones of the subset of data objects from the network cache to accommodate storage of new data objects based on positions of the selected data objects in the sorted list.

13. The method of claim 11 wherein evaluating each of the plurality of data objects according to its cost function value further comprises resorting the subset of data objects each time the cost function value corresponding to any of the subset of data objects changes.

14. The method of claim 11 wherein evaluating each of the plurality of data objects according,to its cost function value further comprises resorting the subset of data objects each time a new data object is stored in the network cache.

15. The method of claim 1 wherein the plurality of metrics for each object includes a number of object requests, the method further comprising recalculating the cost function value for a particular data object each time the particular data object is requested.

16. A computer program product comprising a computer readable medium having computer program instructions stored therein for implementing the method of claim 1.

17. A network cache, comprising: cache memory for storing a plurality of objects; and an operating system which is operable to:

calculate a cost function value for each of a plurality of data objects, the cost function value being determined with reference to at least one metric relating to a total time required to download a corresponding one of the plurality of data objects and providing a relative measure of a cost of caching the corresponding object; and determine whether each of the data objects will be added to the network cache based directly upon its cost function value and not based upon or attributes of currently cached objects.

18. A computer implemented method for evaluating whether to add objects to a network cache comprising:

calculating a cost function value for each of a plurality of data objects, the cost function value being determined with reference to at least one metric relating to a total time required to download a corresponding one of the plurality of data objects and providing a relative measure of a cost of caching the corresponding object; and determining whether each of the data objects will be added to the network cache based directly upon its cost function value and not based upon any attributes of currently cached objects.

19. A computer program product comprising a computer readable medium having computer program instructions stored therein for implementing the method of claim 18.

20. An apparatus comprising:

means for calculating a cost function value for each of a plurality of data objects, the cost function value being determined with reference to at least one metric relating to a total time required to download a corresponding one of the plurality of data objects and providing a relative measure of a cost of caching the corresponding object; and means for evaluating each of the plurality of data objects according to its cost function value, wherein evaluating each of the plurality of data objects according to its cost function value comprises determining whether each of the data objects will be added to the network cache based directly upon its cost function value and not based upon any attributes of currently cached objects.

21. A computer implemented method for evaluating whether to add objects to a network cache, the method comprising:

calculating a cost function value C for each of a plurality of data objects, the cost function value being determined with reference to at least a time DT required to download a corresponding one of the plurality of data objects and an access time AT for the corresponding object; and evaluating each of the plurality of data objects according to its cost function value, wherein evaluating each of the plurality of data objects according to its cost function value comprises determining whether each of the data objects will be added to the network cache base directly upon its cost function value and not based upon any attributes of currently cached objects.

22. The method of claim 21, wherein the cost function value is DT+AT.

23. The method of claim 21, wherein the cost function value is also based upon the size S of each of the plurality of data objects.

24. The method of claim 21, wherein the cost function value is also based upon the number n of cache requests for each of the plurality of data objects.

25. The method of claim 21, wherein the cost function value is also based upon the size S of and the number of cache request n for each of the plurality of data objects.

26. The method of claim 25, wherein the cost function value is $n*AT*DT/S$.

* * * * *